United States Patent [19]

Rau et al.

[11] Patent Number: 4,566,322

[45] Date of Patent: Jan. 28, 1986

[54] APPARATUS FOR ELECTRICALLY MEASURING THE LEVEL OF A LIQUID IN A CONTAINER, PARTICULARLY IN THE GASOLINE TANK OF A VEHICLE

[75] Inventors: Karl Rau, Mühlheim; Heinz Kalk, Neu-Isenburg; Gerhard Metzger, Glasshütten, all of Fed. Rep. of Germany

[73] Assignee: VDO Adolf Schindling AG, Frankfurt am Main, Fed. Rep. of Germany

[21] Appl. No.: 601,452

[22] Filed: Apr. 13, 1984

[30] Foreign Application Priority Data

Apr. 25, 1983 [DE] Fed. Rep. of Germany ....... 3314901

[51] Int. Cl.[4] .................. G01F 23/24; G01F 23/26
[52] U.S. Cl. .................... 73/295; 73/304 R; 73/304 C; 340/618; 340/620; 174/47; 361/284
[58] Field of Search ............ 73/290 R, 304 R, 304 C, 73/308, 327, 295; 220/855; 324/158 P, 60 C, 61 P, 65 P; 340/620, 618; 116/227; 361/284; 174/47; 138/116, 115, 162

[56] References Cited

U.S. PATENT DOCUMENTS

| | | | |
|---|---|---|---|
| 2,802,975 | 8/1957 | Weber, Jr. ................. | 73/304 C |
| 2,843,823 | 7/1958 | Bayless ..................... | 73/304 R |
| 3,050,999 | 8/1962 | Edwards .................... | 73/304 C |
| 4,204,427 | 5/1980 | Gothe et al. ................ | 73/304 C |
| 4,296,630 | 10/1981 | Jung et al. ................. | 73/304 C |
| 4,361,037 | 11/1982 | Hauschild et al. ......... | 73/295 |

FOREIGN PATENT DOCUMENTS

| | | |
|---|---|---|
| 3235534 | 3/1984 | Fed. Rep. of Germany . |
| 7532885 | 5/1976 | France .............................. 73/290 R |

Primary Examiner—Charles Frankfort
Assistant Examiner—Thomas B. Will
Attorney, Agent, or Firm—Martin A. Farber

[57] ABSTRACT

In a device for the electric measurement of the level of a liquid in a container, particularly in the gasoline tank of a vehicle, a support developed as protective tube of a conductor foil is fastened for swinging against the force of a spring (14 and 21) to the top of the container. In order to be able to arrange the support even in containers in which the point of attachment of the support is lower than the highest level to be detected, the support is subdivided into three approximately rigid sections, (2, 3, 5) each two sections (3, 5) being articulated in the manner of a toggle joint to each other and being under spring action. In this way the outermost section (3) is swung, substantially independently of the inside height of the container, on the one end towards the bottom (4) and on the other end towards the top (1) of the container.

28 Claims, 11 Drawing Figures

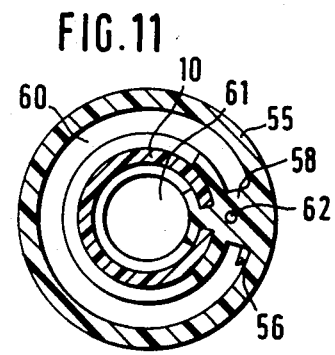
FIG.11
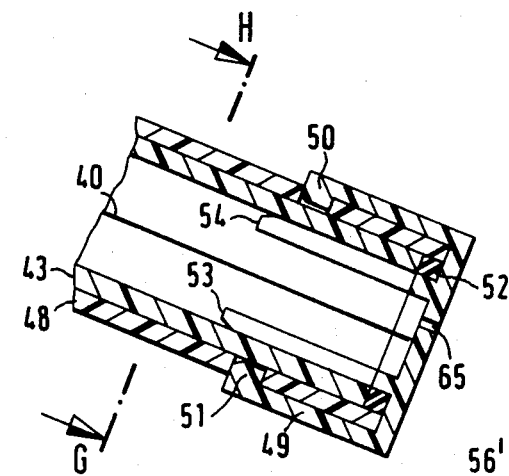
REMOVAL PIPE
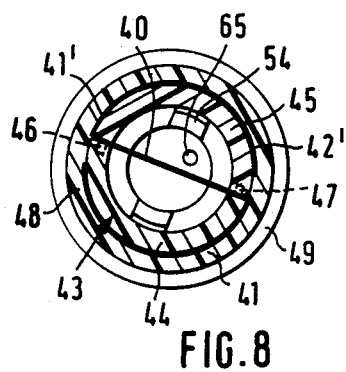
FIG.9
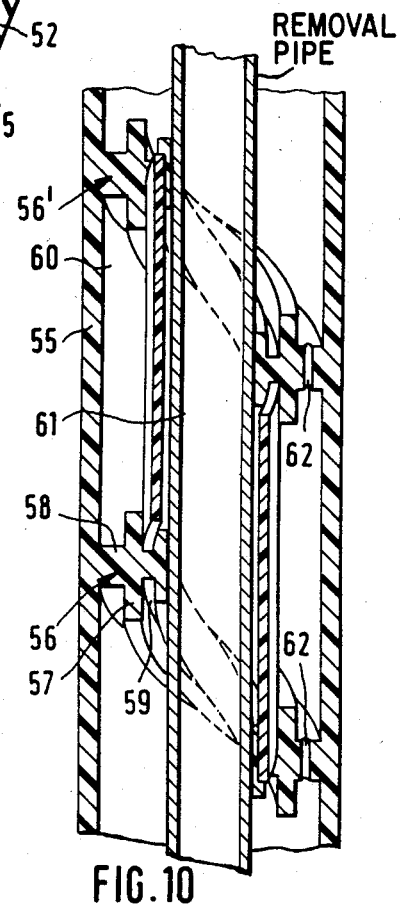
FIG.8
FIG.10

APPARATUS FOR ELECTRICALLY MEASURING THE LEVEL OF A LIQUID IN A CONTAINER, PARTICULARLY IN THE GASOLINE TANK OF A VEHICLE

BACKGROUND OF THE INVENTION

The present invention relates to a device for the electric measurement of the level of a liquid in a container, particularly in the gas tank of a vehicle, having a conductor foil enclosed by a protective tube, the conductors of which foil form a temperature-dependent, externally heated resistor or electrodes of a measurement capacitor, and having a conductor-foil support which is developed as a protective tube, is swingable at the top and is provided with a spring which presses the support against a bottom of the container.

In one such known device (Federal Republic of Germany OS No. 29 08 449), a support element having a main body and a hinged lid which can be held in position by detent means is provided specifically to receive the conductor foil, which is developed as a ribbon cable. Between the lid and the main body there is a hollow space to receive a section of the ribbon cable and at least one opening for the admission of the fluid to be measured. Parallel to this hollow space an intake duct can also be arranged in the main body, within which duct a bent lower section of the ribbon cable having compensation electrodes is introduced. The upper section of the ribbon cable in this case has the measurement electrodes. The ribbon cable can be placed in the open support element and be held or clamped fast by closing and engaging the lid in the support element. The support element and the lid can be developed as a single piece of plastic, the lid being connected to the main body by at least one film hinge. For easy mounting of the device the support element is swingable on top and provided with a spring which presses the support element against the bottom of the container which receives the fluid. The swingability is obtained in this case in particular by a length of hose fastened on top to the support element. By this swingable development the support element can, it is true, be mounted in containers of different height since the support element adapts itself by variable inclination to the inside height available. However, there is the disadvantage that the place of attachment of the support element must always be located at the highest point of the container since otherwise—if it is fastened at a lower point—the level in the part of the container lying above same cannot be measured. As a result, the possibilities for the use of this measurement detector are limited.

In another embodiment of the device it is also known to develop the conductor having the measurement electrodes and compensation electrodes in the form of a round cable of plastic which is arranged in the container without support element. The cable has concentric annular arrangements of electrodes spaced from each other as conduction paths between which hollow chambers are developed. These round cables can adapt themselves flexibly to different shapes of container but they also do not extend directly from a lower point of attachment to a higher top of the container. Furthermore, the precision of the measurement may be impaired by uncontrolled bendings of the cable. This disadvantage also occurs as a result of the fact that the lower end of the cable is freely movable, unless other measures are taken, and may assume, particularly in a vehicle, positions which are difficult to control and define within the container.

The present invention therefore has the object of developing a device for the electrical measurement of level which has a substantially rigid support as protective tube for a conductor foil of the type mentioned above in such a way that the device can be readily adapted to different shapes of container and can be used, in particular, in cases where the point of attachment of the support to the container is lower than a part of the top of the container. Nevertheless, accurate measurement is possible with this device and, in particular, the level between the point of attachment of the support and the highest portion of the top of the container is included in the measurement.

SUMMARY OF THE INVENTION

According to the invention, the support is divided into three approximately rigid sections (2, 3, 5) every two of said sections being pivotally connected together in the manner of a toggle joint and being under spring tensions (springs 14, 21) in such a manner that the outermost section (3) can rest against the bottom (4) and against a top side (1) of the container.

In the support of the invention, a first rigid section serves to attach the entire support to practically any desired point on the top of the container, which can thus also lie lower than other points of the top. The section serving for the attachment is preferably provided with electric connecting means, particularly plugs, for connecting the transmitter to a measurement part located outside the container. The outermost section of the support serves as the protective tube surrounding the conductor foil, the inside of which tube is in communication with the level in the container. The conductor foil assumes a predetermined, particularly flat or helical, configuration within the protective tube. Since the outermost section of the support is automatically swung by the spring force in such a manner that it rests at the one end against the bottom and at the other end against the top of the container, a given configuration is assumed with respect to the container, which configuration is retained even in the event of vibrations on the part of the container. This results, as a whole, in high precision of the measurement. The conductor foil can be provided with a temperature dependent, externally heated resistor and be divided into sections having a measurement resistor and a compensation resistor. The level is then determined by comparison of the measurement resistance with the compensation resistance in the evaluation circuit. The conductor foil can, instead of this, also be provided with measurement electrodes and compensation electrodes for capacitive measurement of the level. In this last-mentioned case, the level is determined in the evaluation circuit by comparison of the measurement capacitance and the compensation capacitance which is determined by the dielectric constant of the fluid to be measured. In this case the section of the conductor foil which bears the compensation electrodes dips completely into the fluid to be measured in the manner that the section having the compensation electrodes is arranged at the lowermost point of the container or in a removal line which is continuously filled with the fluid. Residual quantities of the liquid are determined particularly accurately with this device, even if the bottom of the container is of different depths as a function, for instance, of the state of filling.

The section (2) of the support which can be fastened to the top (1) of the container is preferably shorter than the two other sections (3, 5) thereof. In this way, the length of the central section of the support can also still be kept relatively short despite good adjustment in height to the inside height of the container. The central section can thus be made light, with a saving of material, and nevertheless be mechanically resistant. For this purpose the central section preferably has the shape of a U profile or of a box.

The section (2) which can be fastened to the top (1) of the container preferably has a hollow space (8) which is sealed off from the container and within which a circuit board (9) bearing an evaluation circuit is arranged and the ribbon-shaped conductor foil (10) is preferably introduced into this hollow space through a packing (11). In this way, this section serves not only as part of the entire articulated support but also to house the evaluation circuit. This section is particularly well-suited for this purpose since, as a result of the functional separation from the measurement part of the support, it can readily be made of closed construction and it need only be seen to it that the fluid to be measured does not penetrate into the inside of said section at the place where the conductor foil passes through it. In a first embodiment, the outermost section (3) may advisedly be formed of two separate halves which can be pushed together in direction perpendicular to the longitudinal direction and are held together as a single unit by detent connections. Before the pushing together of the two halves, the conductor foil can be inserted between sides of the halves provided for this purpose, the conductor foil thus being held without tension, in dependable manner, within the cavity of the protective tube formed. By this development, high precision in measurement is obtained with relatively simple assembly.

The outermost section (3) consists of two halves (22, 23; 36, 36') which extend over its length and are developed in such a manner that they can be assembled together in form-locked manner to form the protective tube and be held by detent engagement in this assembled form and that the conductor foil (10) can be clamped between the two halves in such a manner that its measurement conductor surface (26; 40) lies free within the protective tube.

In detail, the embodiment outlined above may advantageously be developed as follows: Each of the two halves (22, 23) is developed with an approximately U-shaped cross section, two legs (22a, 22b and 23a, 23b respectively) of each U-shaped half lying against each other, alternately on the inside and outside, and edge surfaces of the conductor foil being clamped between two adjacent legs (for instance 22a, 23a). In this way, the legs of the U-shaped halves form clamping parts for the edge surfaces of the conductor foil. At these edge surfaces, there is a large-area contact with the support so that the surrounding temperature can be measured well here if the edge surfaces are provided with a compensation resistor. The webs which supplement the two legs so as to form a U shape are curved—in accordance with the customary U shape—and are therefore particularly adapted to be elastically deformed upon the assembling of the two halves.

The two halves (22, 23) of the outermost section can either themselves be provided with detent-notch extentions (35, 35'), preferably on diagonally opposite edges, in order to obtain a dependable detent connection, or else connected with each other by clamp-shaped parts which are pushed over them. Annular or clamp-shaped parts (30, 30', 30'') can be pushed with detent engagement over the two halves (22, 23). In particular, a lower base part which engages in both halves can preferably hold them together.

With this box-shape of the outermost section, formed of two approximately U-shaped halves, the conductor foil (10) is preferably clamped approximately in Z shape with a measurement conductor surface (26) extending diagonally over the inside of the outermost section. The measurement conductor surface which is surrounded by the liquid as a function of the filling level is thus relatively large.

In another advantageous embodiment, the outermost section is formed as a plastic tube slit along a first generatrix, the two halves of which (36, 36') are connected to each other along a second generatrix by a film hinge (37). The conductor foil, or a section of the conductor foil, is simply clamped between the two halves (36, 36') in a center plane lengthwise of the tube. The clamped section of the conductor foil bears the measurement resistors or measurement electrodes. Another section of the conductor foil bearing the compensation resistor or compensation capacitor can in this case lie against an inner wall of one tube half. The small expenditure of material for the halves of the outermost section which are securely connected to each other is advantageous here.

In a third embodiment of the device, the outermost section has an inner tube which is slit along two opposite generatrices, tube halves (44, 45), and is held together by at least one outer tube (48) which surrounds it. In this case the conductor foil is clamped in approximately S shape between each half of the inner tube and the outer tube, and its measurement conductor surface (40) extends in the central plane of the inner tube. Here, therefore, the assembling is effected by pushing the outer and inner tubes one into the other in axial direction with simultaneous clamping of the conductor foil. The connecting of these elements can be reliably effected in this way without additional fastening measures, such as ultrasonic welding.

In a fourth embodiment, the outer section is developed as protective tube (55) with holding elements (56, 56') for the conductor foil (10) developed on its inside in such a manner that the conductor foil is held in helical shape within the protective tube by the holding elements (56, 56') which act on its longitudinal edges. The helically defined alignment of the conductor foil leads to a large wettable surface and a particularly high resolving power of the measurement range without requiring a larger amount of space.

The surface of the conductor foil (10) can extend both radially and axially in the protective tube (55). The radial length of the surface of the conductor foil advantageously permits a relatively small-pitch winding of the conductor foil which leads to a particularly high resolution of the measurement range.

A removal pipe, for instance the intake pipe for the fuel, can extend through the helix of the conductor foil and can thus be integrated in the device without taking up any substantial additional amount of space.

For simple attachment of the conductor foil in correct position, the holding elements (56, 56') can be formed of a holding helix (57) which radially adjoins the inner wall of the protective tube and/or the removal pipe, the holding helix (57) being preferably developed integral with the protective tube or the removal pipe.

Such a development can be effected in simple fashion by injection molding or extrusion from plastic.

For its attachment in correct position, the holding helix (57) may have a groove-like recess (59) into which the region of the longitudinal edge of the conductor foil (10) engages. Due to attachment on both sides, the conductor foil is held particularly securely if the holding helix (57) has two groove-like recesses (59) directed axially in opposite direction and if the distance from groove bottom to groove bottom of the recesses which have their openings opposite each other corresponds approximately to the width of the conductor foil (10).

In another possible embodiment for the attachment of the conductor foil in correct position, the holding helix (57) may have a radially outwardly directed resting surface against which the edge region of the conductor foil (10) rests, a particularly secure mounting being obtained if the holding helix (57) has two resting surfaces and if one edge region of the conductor foil (10) rests against each resting surface.

If the holding helix (57) has a spacer (58) which lies radially against the inner wall of the protective tube (1) and/or the removal pipe, then assurance is had that the conductor foil always is a given minimum distance from the protective tube and/or removal pipe, and thus is well and sufficiently surrounded by liquid.

Good liquid exchange within the protective tube and from the inside of the protective tube to the outside is possible in the manner that the protective tube has radial passage openings and/or the holding helix (57) and a base part which closes off the bottom of the protective tube have axial passage openings (62). At the same time, however, in this way brief variations in the level, due for instance to movements of the container, are damped by the passage openings.

Pivot pins (20, 20') are developed on top of the outermost section of the support, they being turnable in holes in a fork-shaped end (19) of the central section of the support.

The central section has a clamping plate which extends in its longitudinal direction and holds the conductor foil fast in stretched position but forming a loop-shaped section in the swivel or support regions at the ends of the central section.

With the above and other objects and advantages in view, the present invention will become more clearly understood in connection with the detailed description of preferred embodiments, when considered with the accompanying drawings, of which:

FIG. 8 is a cross section through a third embodiment;

FIG. 9 is a longitudinal section through the lowermost point of the outermost section in FIG. 8;

FIG. 10 is a longitudinal section through a part of the outermost section in a fourth embodiment, and FIG. 11 is a cross section through the embodiment of FIG. 10.

FIGS. 2 to 11 are shown on a larger scale than FIG. 1.

Figure 1:
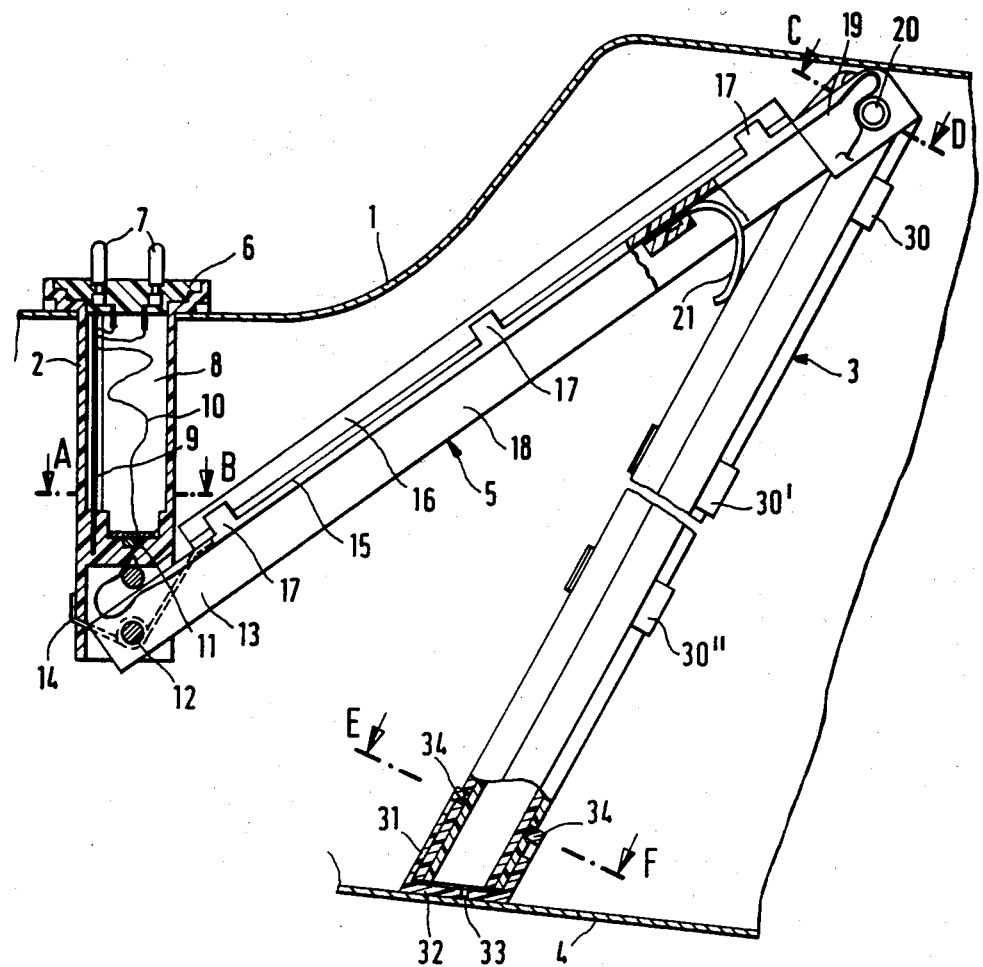
FIG. 1 is an overall side view of the first embodiment of the device, partly in section and partly broken away, inserted in a fuel tank.
Figure 2:
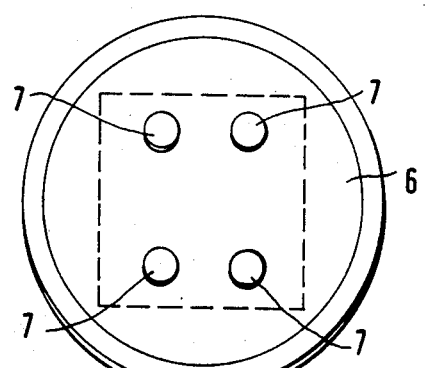
FIG. 2 is a cross section along the line A-B in FIG. 1.
Figure 2:
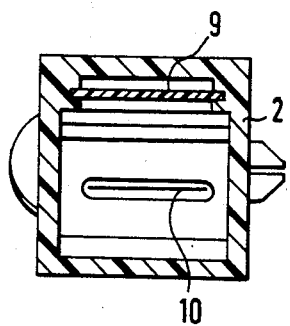
Figure 3:
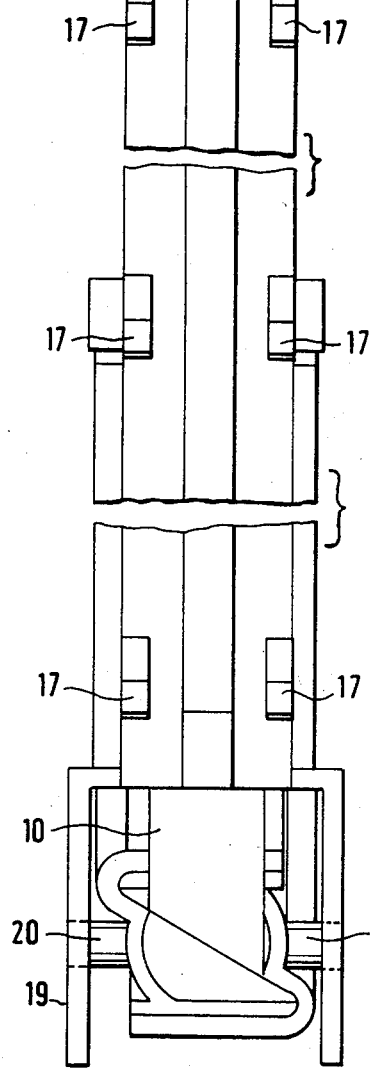
FIG. 3 is a top view of the device of FIG. 1 with the lid of the container removed.

In FIG. 1 the device, referred to as a level probe, is shown in its entirety. It comprises a first section 2 which can be applied to a top side 1 of a container, said section being relatively short and extending downward into the container, a so-called outermost section 3 which rests both against the bottom 4 of the container and against its top 1, and a central section 5 which connects sections 2 and 3 together.

The first section is closed off on top by a flange 6 with plugs 7, to which there can be connected external components of an indicating device, in particular an indicating instrument, as well as a source of operating current or a battery. The plugs lead to a circuit board 9 which is inserted in a hollow space 8 of the first section and on which an evaluation circuit is arranged. A conductor foil 10 which is introduced, sealed by a packing 11 into the hollow space 8, is connected to the circuit board.

The central section 5 is pivotally connected to the first section of the device. The pivot connection consists of pivot pins formed on two sides on the first section, the pivot pin 12 being visible in FIG. 1, and of a first fork-shaped end 13 of the central section, which has holes corresponding to the pivot pins in order to produce a swivel connection. In the region of the pivot pins a spring 14 acts on the first section and on the central section, it endeavoring to swing the central section in counterclockwise direction towards the first section.

Furthermore, the central section is developed in U shape with an upper web 15. Between the upper web 15 and a clamping strip 16 the further course of the conductor foil 10 is clamped. The clamping strip is connected by detents 17 to the main body 18 of the central section.

At its upper end, the central section is developed as a second fork-shaped end 19 with holes in order to form a swivel connection with pivot pin 20 of the outermost section.

The outermost section is swung in counterclockwise direction with respect to the central section by a second spring 21 which is fastened to the central section. In this way, the result is obtained that with any given inside height of the container the outermost section 3 is pressed both against the bottom 4 and against the top 1 as long as the outermost section is longer than the inside height of the container. By the inclining of the outermost section differences in height are automatically compensated for. By the pressure exerted by springs 14 and 21 the result is furthermore obtained that the outermost section is substantially fixed in position with respect to the container.

Figure 4:
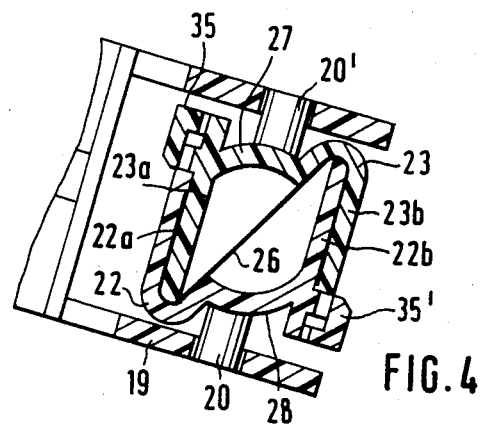
FIG. 4 is a cross section along the section line C-D in FIG. 1.
Figure 5:
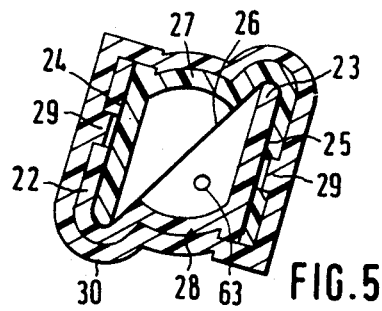
FIG. 5 is a cross section through the section plane along the line E-F in FIG. 1.

In the first embodiment shown in FIGS. 1, 4 and 5 the outermost section consists essentially of two approximately U-shaped halves 22 and 23. The two U-shaped halves lie with their flat legs mutually against each other. The legs of the half 22 are designated 22a and 22b while the legs of the half 23 bear the reference numbers 23a and 23b. The configuration of the connected two halves can be clearly noted from the drawing.

Between one leg of the first U-shaped half and one leg of the second U-shaped half the conductor foil is clamped on both sides of the U shape, it being in approximately Z shape. In this connection, edge surfaces 24, 25 provided with a compensation resistor lie between each two legs while a measurement conductor surface 26 extends in a radial direction and lies free in the center of the hollow space formed by the two U-shaped halves. The two legs of a U shape are connected together in each case by a curved bar 27 and 28 respectively. These bars are elastically deformable when the two U-shaped halves are assembled to form a protective tube or outermost section. For this purpose, annular parts 30, adapted to the outer contour of the U-shaped halves when the latter are placed together, are pushed over the two assembled halves. A lower base part 31 having a bevelled bottom 32 which substantially closes off the outermost section at the bottom is also adapted to the outer contour of the two halves. For the passage of the fluid to be measured, however, a passage opening 33 is provided in the base part. The base part is provided with detent projections 34; the detent parts 30 are also provided with detent projections 29. However, the U-shaped halves may also themselves have projections 35, 35' which can be developed with corresponding mating pieces for the inter-engagement of the two halves.

Figure 6:
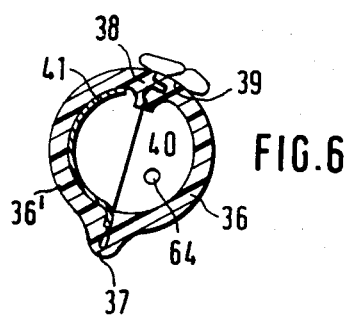
FIG. 6 is a second embodiment of the invention in a cross section through the outermost section.
Figure 7:
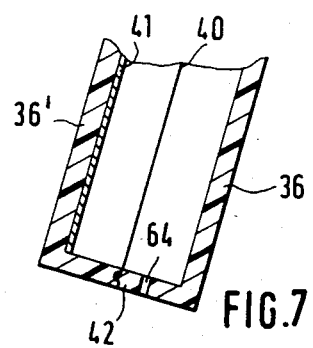
FIG. 7 is a longitudinal section through the lowermost part of the outermost section of FIG. 6.

The second embodiment, shown in FIGS. 6 and 7, is developed in the shape approximately of a circular ring, differing from the approximately rectangular cross section of the protective tube of FIGS. 4 and 5. In this case the protective tube consists of two ring halves 36 and 36' which are connected together as a single piece by a film hinge 37. The film hinge extends along one generatrix while the two ring halves are developed on the opposite generatrix as clamping and closure parts 38, 39. Between the clamping and closure parts 38, 39 and the opposite film hinge a resistance surface 40 of the conductor foil is clamped. An edge surface of the conductor foil 41 lies against the inner wall of the ring half 36'. This edge surface, in its turn, bears the compensation resistance and possibly lead wires.

The lowermost part of the protective tube of FIG. 6 is shown in FIG. 7. From this figure it can again be noted how the resistance surface 40 is clamped and extends radially in a central plane between two protective-tube halves 35 and 36, namely also in the bottom part 42. The bottom part can be welded by ultrasonics to the clamping point of the measurement conductor surface 40.

In the embodiment shown in FIGS. 8 and 9, an inner tube 43 consists of two completely separable tube halves 44 and 45 which can be fitted in form-locked manner to each other by mortise and tenon joints 46, 47. Within the region of these mortise and tenon joints, each of which lies along a generatrix, the conductor foil is again clamped in position, namely its conductor section, i.e. the water level surface 40. The edge regions, i.e. edge surfaces 41 and 41' of the conductor foil are in this case bent into substantially an S shape, so that they substantially surround the inner tube. The inner tube and the conductor foil are held together by a one-piece outer tube 48 which is pushed over the edge regions of the conductor foil and the inner tube located thereunder.

At the bottom, a base part 49 is seated on the concentric arrangement of the inner tube 43 and the outer tube 48, said base part 49 having clamping projections 50, 51 which fit into the outer tube as well as inner webs 53, 54 which facilitate the introduction of the base part. An elastic ring 52 is arranged in the lower end side of the inner tube 43.

In FIGS. 10 and 11, a fourth embodiment of the outermost section, developed as protective tube 55, is shown in which the ribbon-shaped conductor foil 10 is arranged helically with its surface extending axially within the protective tube 1.

Via holding elements 56 and 56' acting on the longitudinal edges of the conductor foil 10, said foil is held in the protective tube 55.

In FIGS. 10 and 11, the holding element 56 consists of a holding helix 57 which is connected to a radially outwardly protruding spacer 58 on the inner wall of the protective tube. On each of its axially directed surfaces the holding helix 57 is provided with a groove-like recess 59, the walls of which are spaced apart radially for the receipt of the conductor foil and to serve as resting surfaces for the foil. The distance apart of the recesses which face each other is equal approximately to the width of the conductor foil, which is inserted by means of its longitudinal edges into the recesses. In this way the conductor foil, forming a helical chamber 60, is held definitely spaced from the inner wall of the protective tube 55 and surrounds, radially inward, a cylindrical space 61. Both on the side of the chamber 60 and on the side of the cylindrical space 61 the conductor foil can be washed substantially over its entire surface by the liquid.

In order to promote an exchange of liquid from one section of the chamber 60 to the other section of the chamber 60 which lies alongside of it and radially outward from the chamber, passage openings 62 are formed in the holding helix. The holding element 56 advantageously permits the use of a removal pipe (FIG. 10), such as an intake pipe for fuel, which can be passed through the cylindrical space 61 so as to avoid taking up other space for the transport of fuel into the container.

An opening 63, 64, 65 respectively in each of the base parts of FIGS. 5; 6, 7; 8, 9 sees to it that the liquid level at the measurement conductor surface corresponds to the level of filling in the container.

Electrical circuits for connection with the conductor foil for use of the foil in a resistance mode of measurement and in a capacitor mode of measurement, for example, are disclosed, respectively, in U.S. Pat. No. 4,361,037 issued in the name of Hauschild et al on Nov. 30, 1982, and No. 4,204,427 issued in the names of Gothe et al on May 27, 1980.

While we have disclosed several preferred embodiments of the invention, it is to be understood that these embodiments are given by example only and not in a limiting sense.

We claim:

1. In a device for electric measurement of the level of a liquid in a container, particularly the gas tank of a vehicle, having a conductive foil enclosed and supported by a conductive-foil support which is formed as a protective tube, which foil may serve as a temperature-dependent, externally heated resistor or an electrode of a measurement capacitor, and wherein the device has comprises a spring which presses the support against a bottom of the container, the improvement wherein said support is divided into three approximately rigid sections, namely, an inner section, a central section, and an outermost section; said inner and said central sections as well as said central and said outermost sections being pivotally connected together and being spring loaded such that the outermost section of the support can rest against the bottom of the container and against a top side of the container.

2. The device according to claim 1, wherein a section of said support is fastenable to the top side of the container and is shorter than the two other sections thereof.

3. The device according to claim 2, wherein said section which is fastenable to the top side of the container has a hollow space which is sealed off from the container, there being a circuit board bearing an evaluation circuit enclosed within said hollow space, said foil being ribbon-shaped, said support further comprising means incorporating a packing for introducing said foil into said hollow space.

4. The device according to claim 3, wherein said outermost section of said support comprises two halves which extend over its length and are provided with mating surfaces for assembly together in a locked manner, the two halves forming said protective tube and being held together by a detent engagement, the mating surfaces clamping together said foil between the two halves with a measurement conductor surface of the foil laying free within the protective tube.

5. The device according to claim 4, wherein each of said two halves is formed with an approximately U-shaped cross section, there being two legs of each U-shaped half lying against each other, alternatively on the inside and outside of the respective halves, edge surfaces of the conductive foil being clamped between two adjacent ones of said legs.

6. The device according to claim 5, wherein said two halves of said outermost section are provided with detent-notch extensions on diagonally opposite edges.

7. The device according to claim 4, wherein said outermost section includes clamp-shaped parts to be pushed with detent engagement over said two halves.

8. The device according to claim 5, wherein said foil is clamped approximately in a Z shape with the measurement conductor surface extending diagonally over the inside of said outermost section.

9. The device according to claim 4, wherein said outermost section is formed as a plastic tube slit along a first generatrix, there being two halves of said tube and a film hinge, the two halves being connected to each other along a second generatrix by said film hinge, and wherein at least a section of said foil is clamped between the two halves in a center plane lengthwise of the tube.

10. The device according to claim 4, wherein said outermost section has an inner tube which is slit along two opposite generatrices into tube halves, said outermost section comprising at least one outer tube which holds together said tube halves and surrounds said inner tube, and said conductive foil is clamped in approximately an S shape between each half of the inner tube and the outer tube, and said measurement conductor surface thereof extends in the central plane of the inner tube.

11. The device according to claim 1, wherein said outermost section is formed as a protective tube with holding elements for said foil disposed on the inside of the outermost section, said holding elements being configured for holding said foil in helical shape within the protective tube, the holding elements contacting said foil on its longitudinal edges.

12. The device according to claim 11, 1, wherein the surface of said foil extends radially in the protective tube.

13. The device according to claim 11, wherein the surface of said foil extends axially in the protective tube.

14. The device according to claim 11, wherein the protective tube of said outermost section is configured for reception of a removal pipe which extends coaxially through the helix of said foil.

15. The device according to claim 11, wherein said holding elements are formed as a holding helix which radially adjoins the inner wall of the protective tube.

16. The device according to claim 13, wherein said holding elements are formed as a holding helix formed integrally with the protective tube.

17. The device according to claim 11, wherein said holding elements are formed as a holding helix which has a groove-like recess for reception of and engagement with the region of the longitudinal edge of said foil.

18. The device according to claim 16, wherein said holding elements are formed as a holding helix which has two groove-like recesses directed axially in opposite directions with their openings opposite each other, and the distance from groove bottom to groove bottom of the recess corresponds approximately to the width of said foil.

19. The device according to claim 11, wherein said holding elements are formed as a holding helix which has a radially outwardly directed resting surface for reception of an edge region of said foil.

20. The device according to claim 19, wherein said holding elements are formed as a holding helix which has two resting surfaces and one edge region of said foil rests against each of said resting surfaces.

21. The device according to claim 14, wherein said holding elements are formed as a holding helix which has a spacer which can lie radially against said removal pipe.

22. The device according to claim 11, wherein said holding elements are formed as a holding helix, said protective tube has radial passage openings, and said holding helix and a base part which closes off the bottom of the protective tube have axial passage openings.

23. The device according to claim 1, further comprising pivot pins disposed on top of the outermost section of said support, there being a fork-shaped end in a central section of said support having holes for rotatably holding said pivot pins.

24. The device according to claim 23, wherein said central section has a clamping plate which extends in its longitudinal direction and holds said foil fast in stretched position while permitting a loop-shaped section of said foil at the ends of said central section.

25. The device according to claim 11, wherein said protective tube has radial passage openings.

26. The device according to claim 25, further comprising a base part which closes off the bottom of the protective tube and has axial passage openings.

27. The device according to claim 11, wherein said holding elements are formed as a holding helix, said protective tube has radial passage openings, and said holding helix has axial passage openings.

28. The device according to claim 11, wherein said holding elements are formed as a holding helix, said holding helix and a base part which closes off the bottom of the protective tube have axial passage openings.

* * * * *